(12) United States Patent
Lance (10) Patent No.: US 6,345,549 B1
(45) Date of Patent: Feb. 12, 2002

(54) LINE ADJUSTMENT ACTUATOR

(75) Inventor: Mark Andrew Lance, Williamstown (AU)

(73) Assignee: Henderson's Industries Pty, Ltd., Victoria (AU)

( * ) Notice: Subject to any disclaimer, the term of this patent is extended or adjusted under 35 U.S.C. 154(b) by 0 days.

(21) Appl. No.: 09/508,814

(22) PCT Filed: Sep. 21, 1998

(86) PCT No.: PCT/AU98/00784

§ 371 Date: Jul. 26, 2000

§ 102(e) Date: Jul. 26, 2000

(87) PCT Pub. No.: WO99/15356

PCT Pub. Date: Apr. 1, 1999

(30) Foreign Application Priority Data

Sep. 19, 1997 (AU) .............................................. PO9303

(51) Int. Cl.[7] .................................................. F16C 1/10
(52) U.S. Cl. .................................................... 74/500.5
(58) Field of Search ........................ 74/500.5, 501.5 R; 297/408, 410; 187/214, 252, 267, 268

(56) References Cited

U.S. PATENT DOCUMENTS

| | | | |
|---|---|---|---|
| 638,918 A | * 12/1899 | Fraser ......................... 187/251 |
| 2,672,057 A | * 3/1954 | Bratz .......................... 74/110 |
| 5,080,200 A | * 1/1992 | Gibson ......................... 187/24 |
| 5,738,412 A | * 4/1998 | Aufrere et al. .............. 297/408 |
| 5,861,084 A | * 1/1999 | Barker et al. ................ 187/264 |
| 5,868,037 A | * 2/1999 | Pohling .................. 74/501.5 R |
| 6,085,872 A | * 7/2000 | Gilliland et al. ............. 187/253 |

FOREIGN PATENT DOCUMENTS

| | | |
|---|---|---|
| DE | A1-2948224 | 6/1981 |
| DE | A1-4218581 | 12/1993 |
| DE | A1-19513705 | 10/1996 |

* cited by examiner

*Primary Examiner*—David A. Bucci
*Assistant Examiner*—Vicky A. Johnson
(74) *Attorney, Agent, or Firm*—Birch, Stewart, Kolasch & Birch, LLP (57) ABSTRACT

An actuator for adjustment of a flexible line such as a cable or rope. The actuator includes a screw threaded spindle and a cooperatively engaging adjustment member having a nut with an internal screw thread that is in threaded engagement with an external screw thread of the spindle. The adjustment member is rotatable relative to the spindle to cause axial movement of the spindle. A turning block or pulley is mounted on an end of the spindle for rotation on an axis extending transversely with respect to the axis of the spindle and the flexible line is retained in relation to the spindle. The flexible line is passed around the turning block or pulley for adjustment of the flexible line by axial movement of the spindle.

15 Claims, 5 Drawing Sheets

LINE ADJUSTMENT ACTUATOR

This application is the national phase under 35 U.S.C. §371 of PCT International Application No. PCT/AU98/00784 which has an International filing date of Sep. 21, 1998, which designated the United States of America.

FIELD OF THE INVENTION

This invention relates to an actuator enabling adjustment of a flexible line, cable, rope or the like.

SUMMARY OF THE INVENTION

The device of the invention is suitable for generating tension in a flexible line, such as a cable, rope or the like. However, it also is suitable for generating a pulling force, such as to adjust the position of a member, with the force being transmitted by such flexible line. In one embodiment, the actuator of the invention comprises a component of an adjustable headrest for a seat, such as a vehicle seat. In part, the actuator is described herein with reference to that application. However, it is to be understood that the actuator of the invention is well suited for use in a wide variety of other applications.

The present invention provides an actuator for enabling adjustment of a flexible line, wherein the actuator includes a screw threaded spindle and a co-operatively engaging threaded adjustment member which comprises a nut in having an internal screw thread by which it is in screw threaded engagement with an external screw thread of the spindle, and wherein the adjustment member is rotatable relative to the spindle so as to cause axial movement of the spindle. At one end of the spindle there is mounted thereon a turning block or pulley which is rotatable on an axis which extends transversely with respect to the axis of the spindle whereby a flexible line such as a cable, rope or the like can be retained in relation to the spindle by being passed around the turning block or pulley.

In one arrangement, the actuator includes a body or housing in which the spindle and the adjustment member are provided. The spindle may be extendable from the housing and, in that case, the turning block or roller may be located exteriorly of the body or housing during at least part of a range of axial movement for the spindle. However, it is preferred that the spindle is not extendable from the housing and that, throughout the range of axial movement for the spindle, the turning block or pulley also is within the body or housing.

The housing is preferably adapted to restrain the spindle against rotation as it is moved axially with rotation of the adjustment member. For this purpose the housing may define a groove or guideway which extends parallel to the axis of the spindle, with a portion of the spindle locating in the groove or guide way. Alternatively, the spindle may define a groove or guideway which extends parallel to the spindle axis, with a projecting portion of the housing being received therein.

The adjustment member is a nut in that it has an internal thread by which it is in threaded engagement with an external thread of the spindle. The nut most preferably is such that, with its rotation, the nut is able to move along that axis as the spindle moves axially relative to the nut. Thus, the nut most preferably is externally threaded and is in threaded engagement with an internal thread defined by the housing, with the external thread of the nut being of opposite hand to its internal thread. In that arrangement, rotation of the nut and, hence, axial movement of the spindle, can be achieved manually or by a motorised drive.

In a mechanical arrangement, there may be a knob or handle journalled on or in the housing, with the knob engaged with the nut whereby the nut is rotatable with the knob. The engagement may be such that the nut is axially adjustable relative to the knob as it rotates with the knob. In one arrangement the engagement is by respective splines extending parallel to the axis of the spindle such that manual rotation of the knob causes rotation of the nut while enabling axial movement of the nut relative to the knob. With an arrangement having a motorised drive, there may be for example a similar splined engagement between the nut and a rotatable output member of a drive motor.

In an embodiment of the actuator of the invention which is suitable for use with or in an adjustable headrest for a vehicle seat (herein referred to as "the headrest embodiment"), the actuator is of elongate form in the direction of the spindle axis. The actuator is adapted at a first end to receive a flexible line by which the headrest is adjustable, while manual or powered drive is able to be provided at its second end to operate the actuator. For ease of further description, the first and second ends are referred to as the cable end and the drive end, respectively, while the corresponding ends of the housing, the spindle and the adjustment member are similarly distinguished.

In the headrest embodiment, the housing overall has a hollow cylindrical form which is open at its drive end, but preferably is partially closed at its cable end. Over a portion of its internal surface nearer to the drive end, the cable defines an internal screw thread. The nut is of cylindrical form and over a portion of its length extending from its cable end, the nut defines an internal screw thread. Over a part of its length from the drive end, the nut defines an external screw thread by which it is engaged with the internal thread of the housing, while the external thread is of opposite hand to the internal thread of the nut. Also the nut is recessed axially inwardly from its drive end to define internal, axially extending splines by which drive is able to be supplied to the nut to cause its rotation relative to the housing.

The spindle of the headrest embodiment, from its drive end, has a main part in the form of an externally screw-threaded shank. The shank is received axially inwardly from the cable end of the nut by screw threaded engagement between the internal thread of the nut and the external thread of the spindle. At its cable end, the spindle is of bifurcated form to provide a pair of tabs which extend longitudinally from the shank part and which define a gap therebetween. The tabs are symmetrically disposed on opposite sides of the axis of the spindle shank, with the tabs parallel and facing each other. The spindle has a pulley which is mounted between the tabs, and which is rotatable on a pin extending through aligned holes in the tabs. The pulley has a diameter which exceeds the lateral dimensions of the spindle, while the pin is perpendicular to and intersects the spindle axis, such that a respective segment of the pulley is exposed each side of the spindle as viewed along the pin axis.

In the headrest embodiment, rotation of the nut in the housing enables the nut to advance or retract axially in housing between limits set by their respective threads in engagement. As the internal thread by which the nut is engaged with the spindle is of opposite hand to the external thread by which the nut is engaged with the thread of the housing, the spindle is able to advance from or retract into the nut as the nut respectively advances or retracts in the housing. Thus, the spindle is able to move axially with respect to the housing by a distance which is the sum of the distances through which the nut moves relative to the housing and the spindle moves relative to the nut.

With movement of the spindle between fully retracted and fully advanced positions, the pulley transverses a longitudinal portion of the housing in which the housing is unthreaded. However, in that portion, there is means for restraining the spindle against rotation relative to the housing as the spindle moves axially. This restraint is provided by the segment of the pulley exposed at each side of the spindle being located in a respective longitudinal groove or slot defined in or through the housing. Also, while the housing preferably is partly closed at the cable end, there is a continuation of each of these grooves or slots such that a flexible cable is able to be inserted through the cable end of the housing, along one groove or slot, and pass around the pulley and then back along the other groove or slot.

As indicated above, drive to the actuator of the headrest embodiment is able to be supplied by means of axially extending internal splines defined within the drive end of the nut. To provide drive, the embodiment includes a knob mounted at the drive end of the housing by which the nut is manually rotatable. The knob has a hand-grip portion and, projecting from this, a stem which defines external splines. The stem is received axially within the recessed drive end of the nut such that the respective splines mesh and the nut is able to be rotated by manual rotation of the knob. Also, the knob has a cylindrical skirt portion which is received coaxially around the drive end of the housing with the stem received in the nut; with the knob being releasably retained on the housing by the skirt having an inner circumferential bead by which it is a snap-fit over external, raised formations on the housing.

The housing of the actuator of the headrest embodiment preferably is of integral construction, rather than of two longitudinally split halves. To enable this and a compact construction, each segment of the pulley which is exposed at a respective side of the spindle locates in a groove defined through the housing. The arrangement is such that the pulley, prior to it being mounted between the tabs of the spindle, is able to be inserted through one of the grooves of the housing. Thus, with the spindle retracted into the nut, but without the pulley and the pin fitted to the spindle, the nut and spindle are inserted into the drive end of the housing, with the tabs of the spindle leading. When the leading end of the internal thread of the nut contacts the trailing end of the thread of the housing, the nut is rotated to initiate threaded engagement between these threads. The rotation is continued to a limited extent until the spindle and nut reach a position in which the gap defined between the tabs is aligned with each of the grooves defined by the housing and the holes in the tabs are aligned with a hole through at least one of diametrically opposed sides of the housing. The pulley then is able to be inserted through one of the grooves in the housing to a position between the tabs, after which the pin is able to be inserted through the hole in the housing, the hole in the nearer tab and then through the pulley and the other tab so as to rotatably mount the pulley in relation to the spindle.

As the nut is rotated to achieve initial threaded engagement between it and the housing, the spindle rotates with the nut in the absence of any factor causing relative rotation between the spindle and nut. However, with the pulley mounted in relation to the spindle, each segment of the pulley is located in a respective groove of the housing. This restrains the spindle against rotation relative to the housing and thereby enables relative rotation between the spindle and nut.

A flexible cable is positioned in relation to the spindle as detailed above. To achieve this, the cable can be inserted through the housing, so as to pass around the pulley, after the pulley has been mounted in relation to the spindle but preferably after the spindle and nut have been at least partially advanced from their fully retracted positions. Alternatively, the cable can be inserted through the housing prior to the pulley being inserted into the housing, with the pulley after its insertion and securement by the pin trapping a part of the cable therearound.

In use of the actuator of the headrest embodiment, one end of the cable is secured, either to the housing at the cable end thereof or to a fixed component such as a fixed part of a headrest. The other end of the cable is secured to a movable component of the headrest. The arrangement may be such that, with the nut and spindle in their advanced positions, the length of cable is just sufficient to enable biasing means to move the moveable component of the headrest to one of two positions between which the movable component is adjustable relative to the first component. As the knob is rotated to retract the nut and spindles, tension in the cable is increased and the cable is caused to advance around the pulley, with the moveable component being adjusted to or towards its other position.

The components of the actuator can be made of a number of materials. In some applications, it can be desirable for at least some components to be of a suitable metal such as aluminium, brass, copper, magnesium, zinc or steel. However, for other applications it is beneficial to have components made of a suitable plastics material, such as by injection moulding from a thermoplastic material.

An adjustable headrest with which an actuator according to the invention is able to be used, may include a core structure which can be mounted on a guide system for up and down movement relative to an associated seat backrest, and which has relatively movable first and second sections. In one preferred arrangement, the first section is an inner section which is mounted on the guide system for relative up and down movement, and the second, outer section is connected to the inner section for relative movement about a pivot axis such as to permit fore and aft adjustment of the headrest position. In another embodiment, the first section is mounted on the guide system for relative up and down movement, and the second section is connected to the first section for relative linear movement such as to permit fore and aft adjustment of the headrest.

The headrest includes a drive system which controls up and down adjustment or fore and aft adjustment, with the drive system including the actuator of the invention and at least one flexible cable through which the actuator controls the relevant adjustment of the headrest. The arrangement is preferably such that there are two such drive systems each respectively controlling up and down adjustment and fore and aft adjustment. In that arrangement the headrest can be readily adapted for either two-way adjustment or four-way adjustment. In the former case, one of the actuators is selected as the operable actuator, whereas in the latter case both actuators are operable. It is further preferred that each of the two drive systems is readily adaptable to either manual operation or power operation.

In one particular embodiment of the invention the headrest is adapted for use with a mounting system including two laterally spaced support posts which are secured to the seat backrest and project beyond the upper edge of that backrest. The headrest core structure may be mounted on both of the posts for relative sliding movement in the axial direction of the posts. A cross member may extend between and be secured to the upper end portion of each of the posts, in which case the elevation drive system of the headrest may extend between that cross member and the first section of the headrest core structure. By way of example, first biasing means may act between the cross member and the first section so as to urge the core structure to move down the support posts away from the cross member, in which case the flexible cable of the elevation drive system is operable to pull the core structure upwards against the influence of the first biasing means. Second biasing means may urge the second section of the core structure in a rearward direction relative to the inner section, in which case the flexible cable of the fore and aft drive system is operable to pull the second section forward against the bias.

The actuator or each actuator, may be mounted on the headrest, or it may be mounted on the backrest or at some other convenient location remote from the headrest.

It will be convenient to hereinafter describe the invention in greater detail by reference to the accompanying drawings which show example embodiments of the invention. The particularity of those drawings and the related detailed description is not to be understood as superseding the broad description of the invention given in the preceding part of this specification.

DETAILED DESCRIPTION OF THE INVENTION

Figure 1:
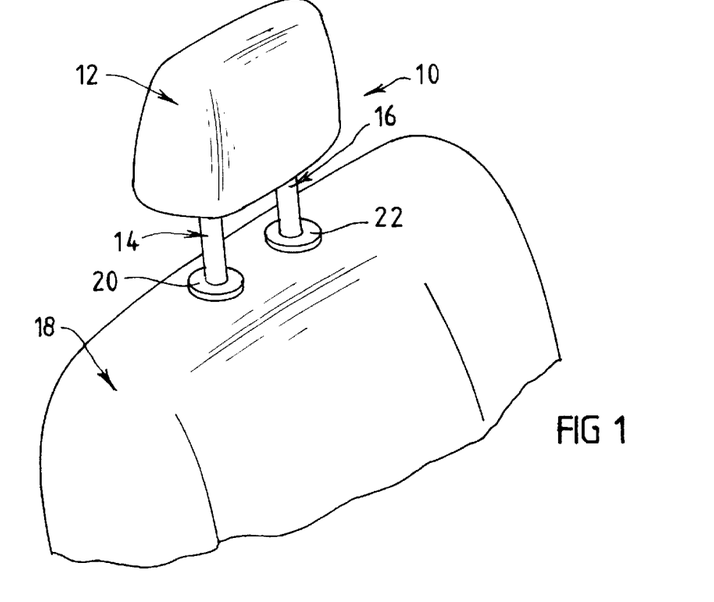
FIG. 1 shows a typical vehicle seat headrest arrangement with which the actuator of the invention is applicable.

The vehicle seat headrest arrangement 10 of FIG. 1 has a headrest 12 which is mounted on two laterally spaced support posts 14 and 16, each of which is attached to the seat backrest 18. The posts 14 and 16 are located in respective tubular guides 20 and 22 which are attached to the backrest 18 in a known manner. It is preferred that the posts 14 and 16 are removable from the backrest 18, and it is further preferred that the headrest 12 and the posts 14 and 16 combine to form a headrest sub-assembly in which the headrest 12 is mounted on the posts 14 and 16 for relative movement so as to permit the required adjustment of the headrest elevation. In such an arrangement the posts 14 and 16 are normally held against movement relative to the guides 20 and 22 when the sub-assembly is mounted on the seat backrest 18.

In a preferred embodiment of the invention the headrest 12 includes a relatively rigid core structure over which is applied suitable padding and trim material. The padding and trim material may be applied to the core structure in any suitable manner, including that described in the specification of PCT patent application AU97/00325.

Figure 2:
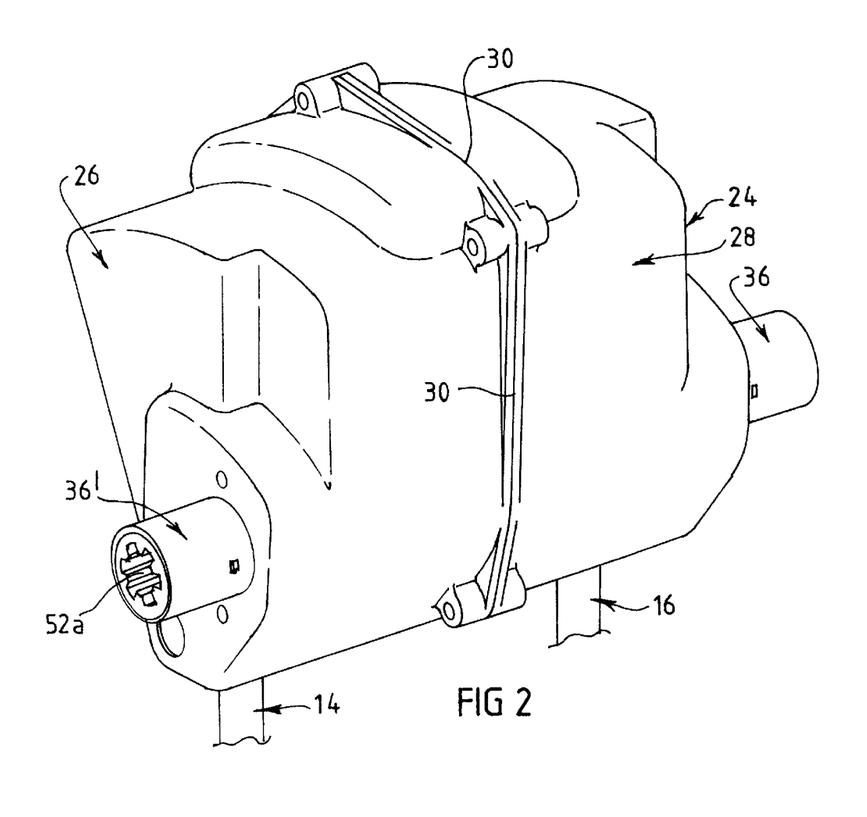
FIG. 2 is a semi-diagrammatic perspective view of the core structure of the headrest of FIG. 1.

FIG. 2 is a semi-diagrammatic perspective view of a core structure 24 of the headrest 12. The core structure 24 includes a hollow housing formed of two parts 26 and 28 which are shown to be separable at an interface 30 located approximately midway in the width of the core structure 24, but other arrangements could be adopted.

Figure 3:
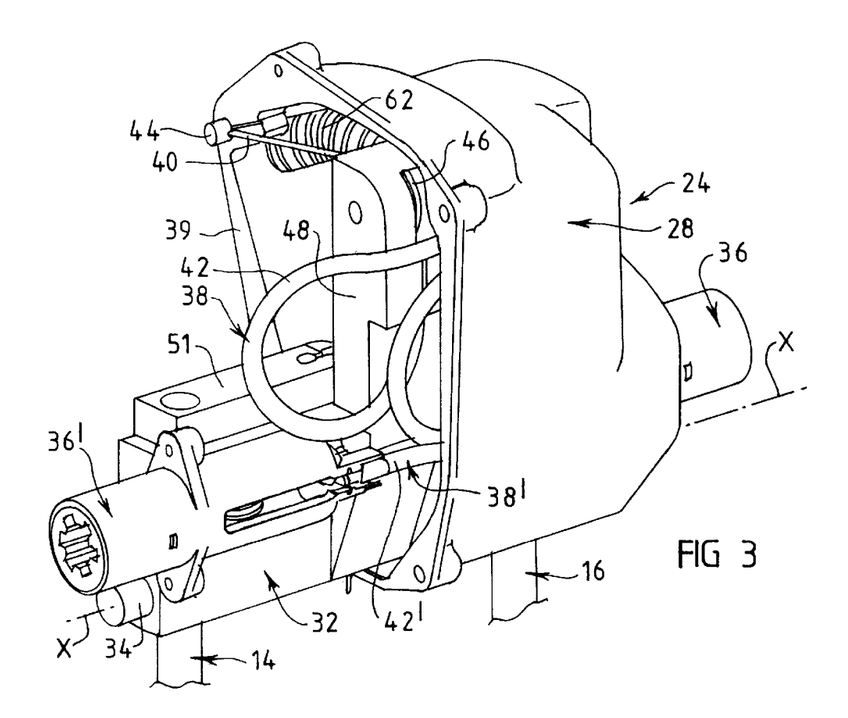
FIGS. 3 and 4 are similar to FIG. 2, but are shown partially cut away to illustrate the interior of the core structure in respective adjustment positions.
Figure 4:
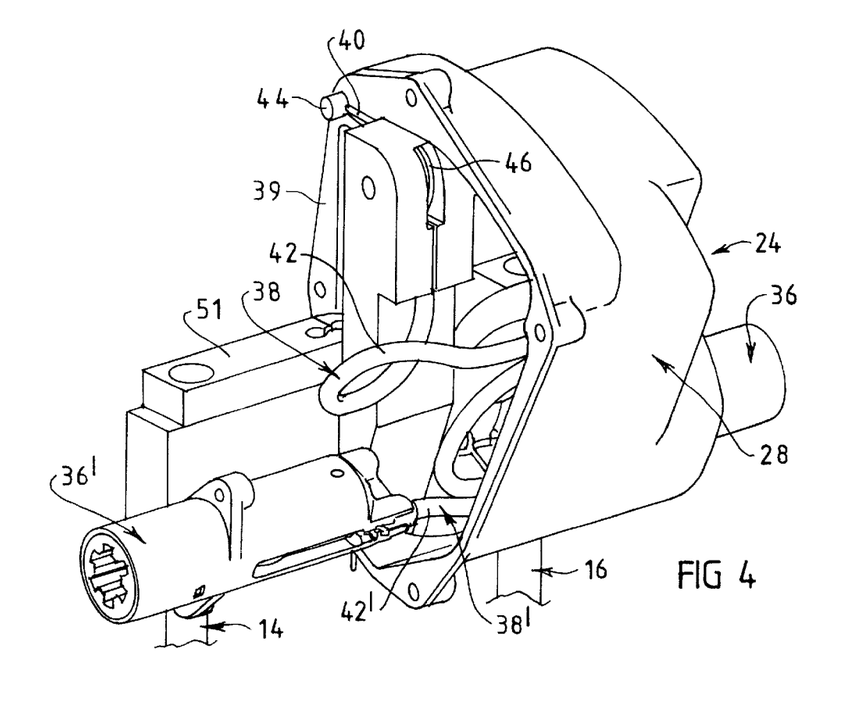

FIGS. 3 and 4 are views similar to FIG. 2, but in which the housing part 26 is removed to show the interior of the housing. The housing 26,28 forms an outer section of the core structure 24 and is mounted on an inner section 32 which is in turn mounted on the posts 14 and 16. The inner section 32 is slidably mounted on the posts 14 and 16 to permit adjustment of elevation as hereinafter described, and the housing 26,28, is mounted on the inner section 32 for relative movement about a pivotal axis X—X (FIG. 3) so as to permit fore and aft adjustment as hereinafter described. In the construction shown, each housing part 26 and 28 is rotatably mounted on a respective one of two stub axles 34 (FIG. 3) located at respective opposite sides of the inner section 32, so as to enable movement about the axis X—X. Arrangements other than that particularly shown in FIGS. 3 and 4 could be adopted to achieve the objectives of the invention.

In the particular arrangement shown the drive system for fore and aft adjustment includes an actuator 36 and a flexible cable 38 extending between the actuator 36 and a rear wall 39 of the housing 26,28. The cable 38 is preferably of the Bowden type, having a wire core 40 slidable axially within a tubular cover 42. A ferrule 44 at one terminal end of the cable 38 is attached to the housing wall 39 against relative movement, except perhaps for some rotational movement to compensate for adjustment of the headrest fore and aft position. The end portion of the core 40 to which the ferrule 44 is attached extends over a roller 46 rotatably mounted on an upstanding arm 48 of the inner section 32. The cable cover 42 extends between the arm 48 and the actuator 36.

Figure 5:
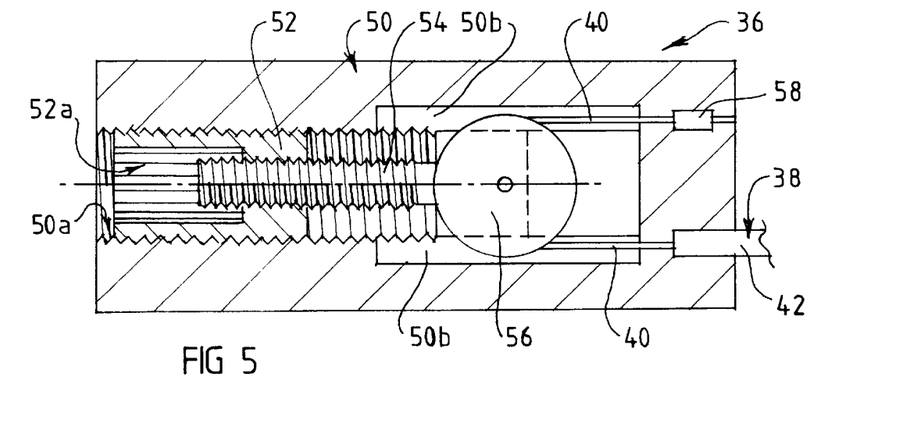
FIG. 5 is a diagrammatic illustration of one embodiment of actuator suitable for the arrangement of FIGS. 1 to 4.
Figure 6:
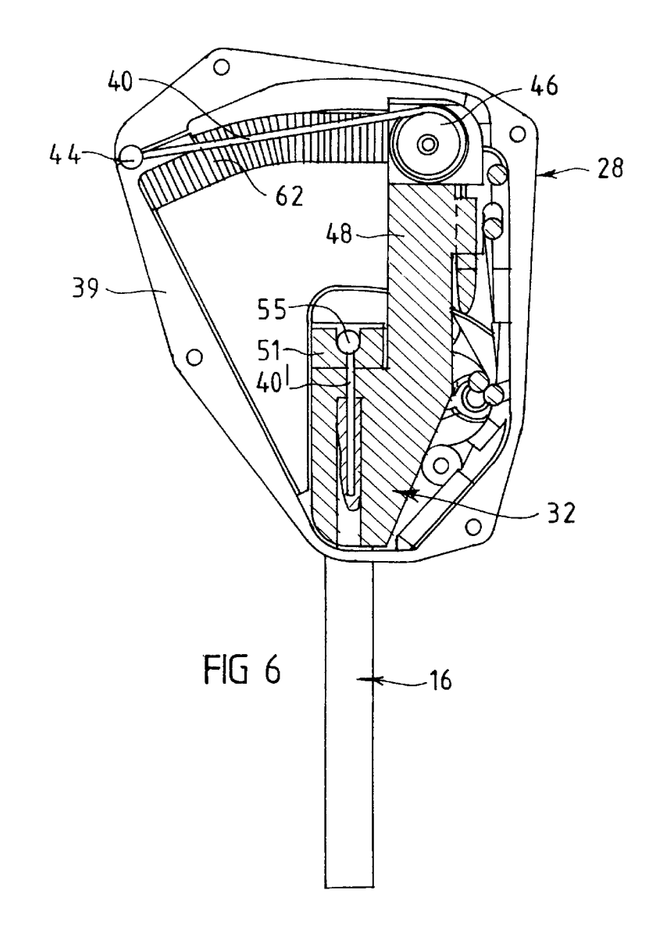
FIGS. 6 and 7 are side-on sectional views which correspond to FIGS. 3 and 4, respectively.
Figure 7:
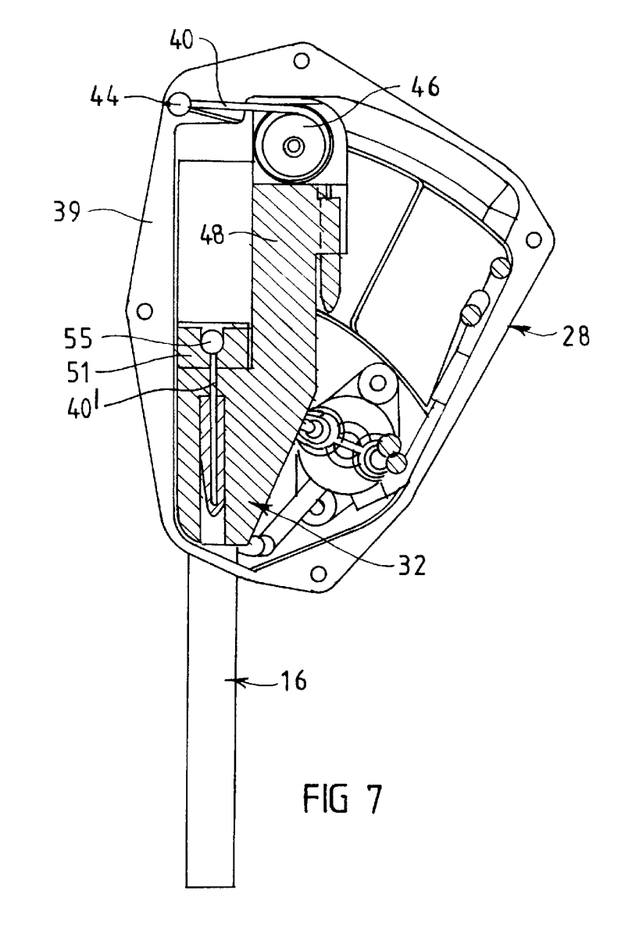

FIG. 5 is a diagrammatic illustration of one form of device suitable for use as the actuator 36. That device includes a body 50 which is attached to the core structure housing 26,28 in a suitable manner, a screw threaded tubular nut 52 rotatably mounted within the body 50, and a screw threaded spindle 54 which cooperatively engages with an internal thread of the nut 52. The nut 52 also has an external thread which cooperatively engages with an internal thread formed within a bore 50a of the body 50. The internal and external threads of the nut 52 are of opposite hand so as to increase the cable adjustment achieved by each complete rotation of the nut 52. In that regard, the spindle 54 is restrained against rotation with the nut 52 so as to move axially in response to nut rotation, and that restraint may be achieved in any suitable manner. The arrangement is such that rotation of the nut 52 in one direction (eg., clockwise) causes the spindle 54 to be moved axially to the left of FIG. 5 and simultaneously causes the nut 52 to move axially in the same direction because of the interaction with the thread of the bore 50a. Axial movement of the spindle 54 is thereby increased. Any suitable means, such as a hand wheel (not shown), can be attached to the nut 52 to enable convenient rotation of the nut 52, and the bore 52a of the nut 52 may be splined for that purpose as shown by FIG. 2. Actuators other than that particularly shown could be adopted.

The cable 38 is connected to the spindle 54, and in the particular arrangement shown that connection is achieved by passing the cable core 40 around a turning block or roller 56 which is rotatably mounted on the end of the spindle 54. A ferrule 58 at the terminal end of the core 40 is captured within a cavity formed in the actuator body 50, and the adjacent end 60 of the cable cover 42 abuts against an opposed shoulder formed in the body 50. It is preferred that the roller 56 is slidably located in at least one longitudinally extending slot 50b formed within the body 50 so as to thereby positively hold the spindle 54 against rotation with the nut 52.

Biasing means, such as a coil compression spring 62, preferably acts between the housing rear wall 39 and the relatively fixed arm 48 so as to normally bias the headrest 12 to the rearward position shown in FIG. 3. Rotation of the actuator nut 52 in one direction pulls the cable core 40 further into the actuator body 50 and thereby pulls the housing rear wall 39 towards the relatively fixed arm 48. The spring 62 is compressed as a consequence of that movement. Rotation of the nut 52 in the opposite direction causes an increase in the effective length of the cable core 40 extending between the actuator 36 and the housing rear wall 39, and the spring 62 then acts to move the housing rear wall 39 away from the arm 48. Fore and aft adjustment of the headrest position is thereby achieved in a relatively simple manner. FIGS. 3 and 4 show the headres 12 in the rearmost and forwardmost positions respectively.

In the particular arrangement shown, a cross member 51 extends between and interconnects the upper ends of the two posts 14 and 16. The member 51 is fixed to the posts 14 and 16 against relative movement. It is preferred, that at least one biasing spring (not shown) acts between the member 51 and the headrest core structure 24 so as to urge the headrest 12 downwards along the posts 14 and 16. In the arrangement shown, two springs are provided for this purpose and each acts between the member 51 and the inner section 32 of the structure 24. It will be apparent that other biasing means could be adopted.

The springs between member 51 and structure 24 form part of the headrest elevation drive system, and in the arrangement shown that system also includes an actuator 36' and a flexible cable 38'. The actuator, 36' may be of the same kind as, or similar to, the actuator 36 and the cable 38' may be of the same general kind as the cable 38. A ferrule 55 at one end of the core 40' of the cable 38' is attached to the member 51 in a suitable manner, and the other end of the core 40' may be attached to the actuator 36' in the manner described in relation to FIG. 5. The cover 42' of the cable 38' extends between the actuator 36' and the inner section 32 so as to be held against axial movement relative to both the actuator 36' and the section 32. Suitable operation of the actuator 36' pulls the headrest 12 up the posts 14 and 16 against the action of the springs between member 51 and structure 24, to an uppermost position.

In the arrangement shown by FIGS. 2 to 4 the actuators 36 and 36' are mounted on the headrest 12 and are accessible at respective opposite sides of the headrest 12. Other arrangements are clearly possible. In one alternative arrangement, actuator 36 (at least) is located remote from the headrest 12. If the support post 14 is of tubular form the cable 38' may extend through the interior of that post, or alternatively the post 16.

If the headrest 12 is to be adapted for four-way adjustment the cable 38 associated with the actuator 36 could extend through the interior of the post 16 (assuming it is tubular), or alternatively the post 14.

The position of headrest 12 could be adjusted by a powered arrangement rather than a manually operable arrangement as so far described. By way of example, either one or both of the actuators 36 and 36' could be operated by an electric motor, and that is possible whether the actuators are located on the headrest 12 or elsewhere.

Figure 8:
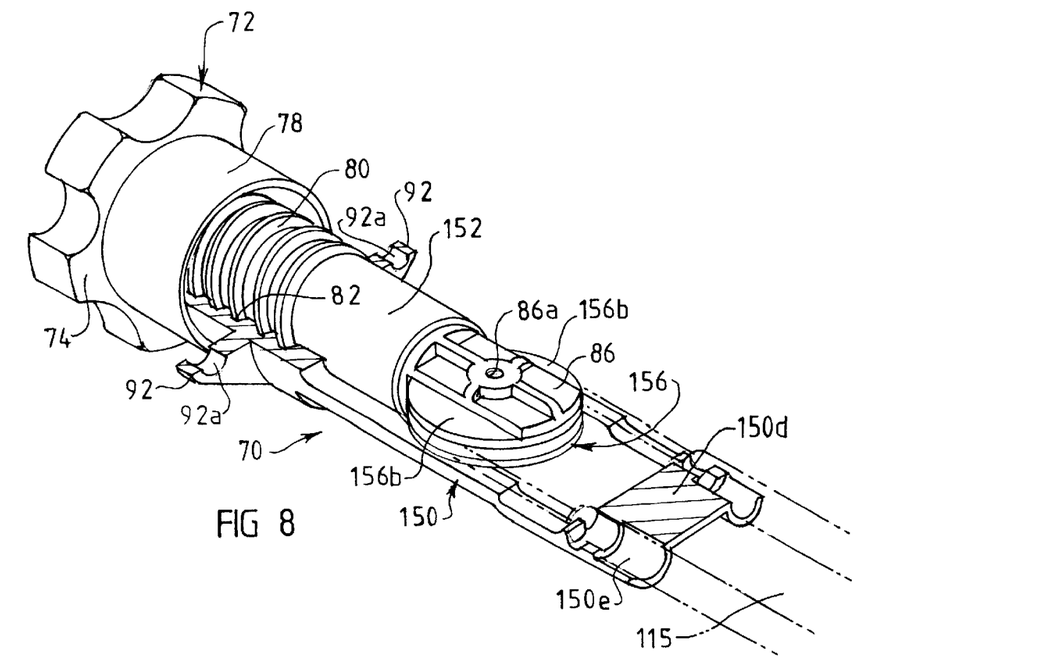
FIG. 8 shows a perspective view of another embodiment of an actuator according to the invention, shown partly cut away.
Figure 9:
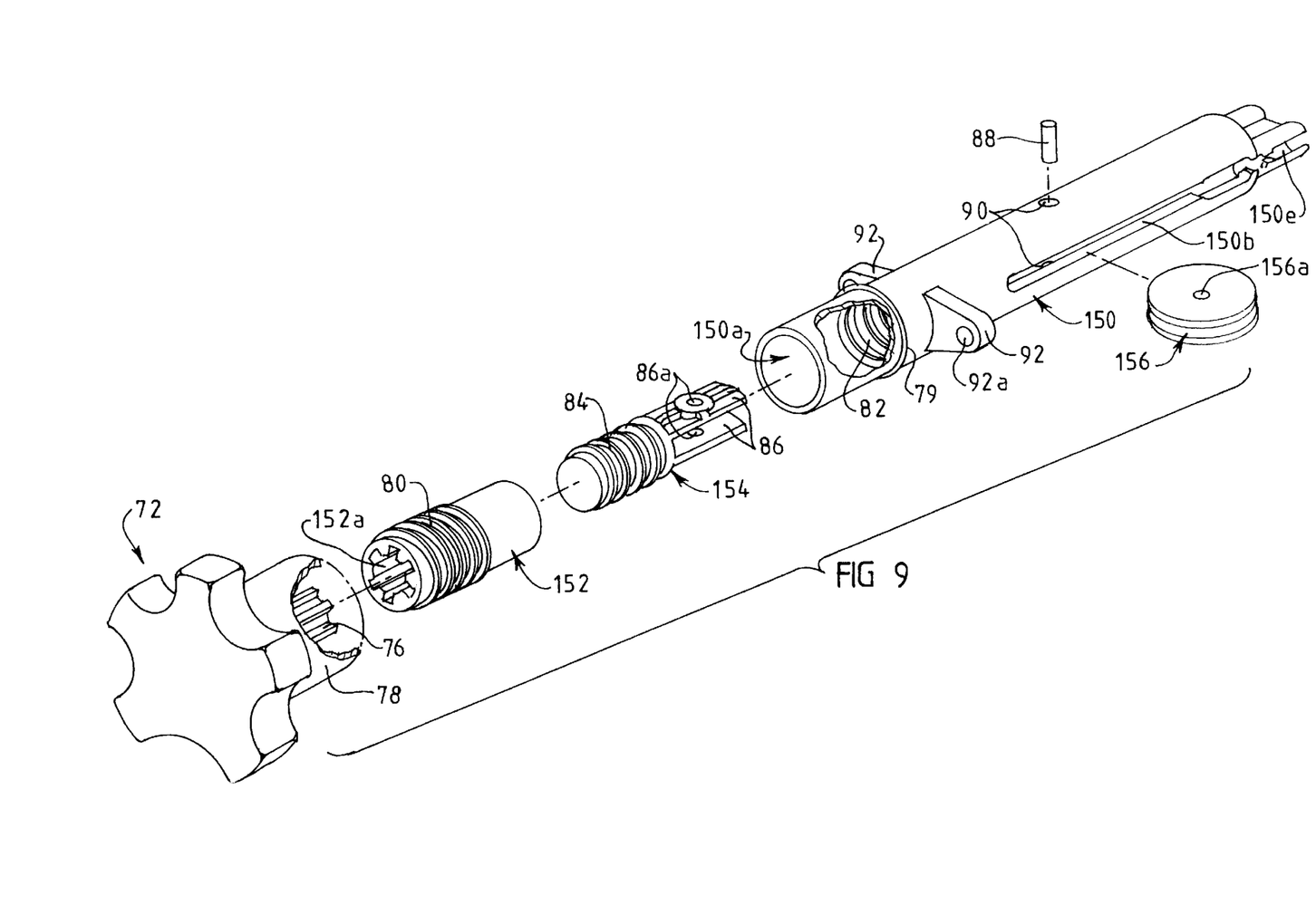
FIG. 9 is an exploded perspective view of the actuator of FIG. 8.

The actuator 70 of FIGS. 8 and 9 generally will be understood from the description directed to actuator 36 of FIG. 5. Also, actuator 70 largely accords with the headrest embodiment referred to above and description of that embodiment is to be applied, where relevant, to actuator 70. Further description of the actuator 70 therefore is limited largely to matters of difference in actuator 70 over actuator 36. Also, parts of actuator 70 which correspond to those actuators 36 have the same reference numeral, plus 100.

The body or housing 150 of the actuator 70 is of a cylindrical, tubular form. The bore 150a of the housing 150 defines an internal thread, 82 near to the drive end; that is, the left hand end in each of FIGS. 8 and 9. Along a major part of the length of housing 150, between the thread 82 and the other, cable end, housing 150 defines longitudinal slots 150b, which open to the exterior of housing 150. At the cable end, housing 150 is closed across bore 150a by a diametrical web 150d. At each side of web 150d, housing 150 defines a respective groove 150e; with each groove 150e opening laterally to the exterior of the housing 150 and providing an axial continuation of a respective slot 150b through to the cable end.

The drive end of housing 150 is closed by a knob 72 by which actuator 70 is manually operable. The knob 72 has a hand-grip portion 74 and, extending from the portion 74, a splined stem 76 and a cylindrical skirt 78 which is co-axial with the stem 76. The knob 72 is rotatably mounted on housing 150 by the skirt 78 being axially received onto the drive end of the housing 150, and is retained on housing 150 by a suitable snap-fit. For this purpose, there may be a circumferential bead (not shown) on the inner surface of the skirt 78 which is a snap-fit over a similar bead 79 around the external surface of housing 150. If such beads would result in excessive force being required to fit or remove the knob 72, one of the beads can be made discontinuous, to provide a circumferentially spaced series of raised formations.

The splined stem 76 of the knob 72 is of complementary form to, and received in, the splined bore 152a extending inwardly from the drive end of nut 152. The arrangement is such that rotation of the knob 72 causes rotation of the nut 152 relative to the housing 150. Also, the meshing engagement between stem 76 and splined bore 152a is maintained as the nut 152 is advanced or retracted axially along the housing 150 as permitted by an external screw thread 80 of the nut 152 meshing with an internal screw thread 82 of the housing 150.

Again, the thread 80 is of opposite hand to an internal screw thread (not shown) defined by the nut 152. That internal thread is in meshing engagement with the thread 84 defined by the spindle 154 and, because of the opposite handedness, spindle 154 is able to axially advance or retract relative to the nut 152 as the nut 152 axially advances or retracts, respectively, relative to the housing 150.

As shown, the cable end of the spindle 154 is bifurcated to define two axially extending parallel tabs or fingers 86. The length of, and opening between, the fingers 86 is such that they are able to receive turning block or pulley 156 therebetween, for rotation of the block or pulley 156 on a pin 88. The pin 88 is inserted through a hole 86a in each of the fingers 86 and a bore 156a through the pulley 156. The width of the fingers 86 is similar to the diameter of the threaded portion of the spindle 154. However, the pulley 156 has a larger diameter such that a respective segment 156b of pulley 156 is located outside the fingers 86, to each side of spindle 154. Each of the segments locates in a respective slot 150b of housing 150.

The nut 152, the spindle 154 and pulley 156 are mounted within housing 150 as described above for the headrest embodiment. Thus, pulley 156 is inserted through one of slots 150b so as to be positioned between the fingers 86. The pin 88 then is inserted, via a hole 90 in housing 150, which is one of two diametrically opposite holes. For disassembly, pin 88 first is extracted via a hole 90.

As shown, housing 150 has a pair of oppositely extending ears 92, each defining a hole 92a. The actuator 70 can be mounted in a required position, by a screw or other suitable fastener inserted through each hole 92a to engage in a suitable fixed structure.

In FIG. 8, a cable 115 (shown in dotted outline) extends into housing 150 via one groove 150e and along one slot 150b, to pass around the pulley 156 and back along the other slot 150b and out the other groove 150e. One end of cable 115 may be fixed exteriorly of the actuator 70, such as to a fixed structure relative to which the actuator 70 is secured. Alternatively, that end of cable 115 may be secured in the other groove 150e by provision of ferrule, as described in relation to actuator 36 of FIG. 5. In either case, rotation of the knob 72 to cause retraction of the nut 152 and the spindle 152, and hence of the pulley 156, causes one run of cable 115 to be drawn further into housing 150. Similarly, opposite rotation to advance the nut 512, the spindle 154 and the pulley 156 enables an increase in the effective length of that one run extending from actuator 70.

Again, the cable 115 may be of the Bowden type. Also, there may be a resilient bias acting to restrain the cable against being drawn into the housing 150 and to draw the cable out.

In the arrangement of the invention in which the spindle is able to advance from or retract into the nut as the nut respectively advances or retracts in the housing the spindle is able to move through the sum of the distances through which it moves relative to the nut and the nut moves relative to the housing. When the spindle and nut are fully retracted, the spindle is nested in the nut within the same portion of the housing as contains the retracted nut. This shortens the length of the actuator relative to that required for the same range of movement of the pulley but with the nut not axially movable. The shorter length increases the range of applications for which the actuator is suitable.

The limits of axial movement preferably are not set by reaching tapered ends of the screw threads. Such tapered ends provide an undesirable spongy response due to the limits varying with applied rotational force and, particularly with plastics components, it can cause them to be stretched. The limits therefore most preferably are set more precisely. In the case of axial retraction, the limit preferably is set by the drive end of the spindle hitting an abutment, such as a transverse wall across the bore of the nut, at drive end of the internal thread of the nut. Thus, the transverse wall may separate respective blind bores of the nut, one defining the internal thread and the other being splined.

In the case of axial advancement, the limit preferably is set by the cable end of each of the external thread of the nut and the internal thread of the housing ending in an abrupt end face. Thus, where the threads are of square section, each may terminate at an end face substantially in a diametrical plane. The respective end faces, when abutting define the limit for axial advance.

Finally, it is to be understood that alterations and additions may be made to the arrangements herein described without departing from the spirit or ambit of the invention.

What is claimed:

1. An actuator for enabling adjustment of a flexible line such as a cable or rope, comprising:

a screw threaded spindle and a co-operatively engaging adjustment member which comprises a nut having an internal screw thread for threaded engagement with an external screw thread of the spindle, and wherein the adjustment member is rotatable relative to the spindle to cause axial movement of the spindle, and wherein a turning block or pulley is mounted on one end of the spindle for rotation on an axis extending transversely with respect to the axis of the spindle whereby the flexible line can be retained in relation to the spindle, by being passed around the turning block or pulley, to enable adjustment of the line by axial movement of the spindle.

2. An actuator according to claim 1, further including a housing or body in which the spindle and adjustment member are provided.

3. An actuator according to claim 2, wherein the spindle is extendable from the body.

4. An actuator according to claim 3, wherein the turning block or pulley is located externally on the housing during at least part of a range of axial movement from the spindle.

5. An actuator according to claim 2, wherein the spindle is not extendable from the housing and throughout a range of axial movement from the spindle, the turning block or pulley is within the housing.

6. An actuator according to claim 2, wherein the housing is adapted to restrain the spindle against relative rotation as the spindle is moved axially with rotation of the adjustment member.

7. An actuator according to claim 6, wherein the housing defines a groove or guideway which extends parallel to the axis of the spindle, with a portion of the spindle locating in the groove or guideway.

8. An actuator according to claim 2, wherein the adjustment member has an external screw thread by which it is in threaded engagement with an internal thread of the housing and the respective threads of the nut are of opposite hand whereby the nut is moveable exactly with respect to the housing as it rotates to cause axial movement in the same direction of the spindle relative to the nut.

9. An actuator according to claim 1, further including a knob or handle engaged with the adjustment member whereby the adjustment member is rotatable with manual rotation of the knob or handle.

10. An actuator according to claim 1, further including a motorised drive having drive motor of which a rotatable output member is engaged with and operable to rotate the adjustment member.

11. An actuator according to claim 1, wherein the spindle has a pair of axially extending fingers which extend from an end thereof remote from the adjustment member and between which the turning block or pulley is rotatably mounted.

12. An actuator according to claim 11, wherein a respective segment of the block or pulley extends outwardly beyond the fingers to each side of the spindle, and each segment is received in a respective slot defined by the housing to thereby restrain rotation of the spindle relative to the housing during axial movement of the spindle.

13. An adjustable headrest for a seat, such as a vehicle seat, wherein the headrest includes a core structure mountable on a guide system for up and down movement relative to a seat backrest and having relatively movable first and second sections enabling fore and aft adjustment, and wherein the headrest further includes a drive system for controlling up and down or fore and aft adjustment, with the drive system including an actuator according to claim 1, and at least one flexible line or cable through which the actuator controls the relevant adjustment of the headrest.

14. A headrest according to claim 13, wherein there are two drive systems each respectively controlling up and down and fore and aft adjustment.

15. A headrest according to claim 14, wherein the first section of the core structure is an inner section mountable on the spindle system for relative up and down movement, and the second section is an outer section connected to the inner section for relative movement about a pivot axis as to permit the fore and aft adjustment.

* * * * *